(12) United States Patent
Son

(10) Patent No.: US 9,529,931 B2
(45) Date of Patent: Dec. 27, 2016

(54) IMAGE DISPLAY DEVICE AND MEMORY MANAGEMENT METHOD OF THE SAME

(75) Inventor: Chulmin Son, Seoul (KR)

(73) Assignee: LG Electronics Inc., Seoul (KR)

( * ) Notice: Subject to any disclaimer, the term of this patent is extended or adjusted under 35 U.S.C. 154(b) by 693 days.

(21) Appl. No.: 13/609,935

(22) Filed: Sep. 11, 2012

(65) Prior Publication Data

US 2013/0318428 A1   Nov. 28, 2013

(30) Foreign Application Priority Data

May 23, 2012  (KR) ........................ 10-2012-0055024

(51) Int. Cl.
| | |
|---|---|
| G06F 17/00 | (2006.01) |
| G06F 17/30 | (2006.01) |
| G06F 17/24 | (2006.01) |
| G06F 17/22 | (2006.01) |
| G06F 17/25 | (2006.01) |
| G06F 3/06 | (2006.01) |

(52) U.S. Cl.
CPC ....... *G06F 17/30902* (2013.01); *G06F 3/0652* (2013.01); *G06F 17/2205* (2013.01); *G06F 17/2211* (2013.01); *G06F 17/2235* (2013.01); *G06F 17/24* (2013.01); *G06F 17/25* (2013.01); *G06F 17/30* (2013.01); *G06F 17/30091* (2013.01)

(58) Field of Classification Search
CPC .............. G06F 17/2211; G06F 17/2205; G06F 17/2235; G06F 17/24; G06F 17/25; G06F 17/30091; G06F 3/0652; G06F 17/30876; G06F 17/30; G06F 17/30902

USPC   715/760, 771, 772, 806, 807, 808; 711/118, 135, 151, 158
See application file for complete search history.

(56) References Cited

U.S. PATENT DOCUMENTS

| | | | |
|---|---|---|---|
| 6,681,298 B1* | 1/2004 | Tso et al. ...................... 711/133 |
| 6,876,466 B1* | 4/2005 | Morikawa ................. G06T 1/60 358/1.14 |
| 7,698,513 B2* | 4/2010 | Sechrest ............... G06F 12/122 711/100 |
| 8,224,964 B1* | 7/2012 | Fredrickson ...... H04L 29/08729 709/227 |
| 8,935,620 B1* | 1/2015 | Cox ....................... G06F 3/0483 715/234 |
| 2003/0033304 A1* | 2/2003 | Uesaka .......................... 707/10 |

(Continued)

FOREIGN PATENT DOCUMENTS

CN            102073559 A       5/2011

*Primary Examiner* — Chau Nguyen
(74) *Attorney, Agent, or Firm* — Birch, Stewart, Kolasch & Birch, LLP

(57) ABSTRACT

According to the present disclosure, there is disclosed an image display device and a memory management method thereof. According to an embodiment of the present disclosure, when a plurality of web pages are loaded and thus the memory space is insufficient, the loaded web pages may be implemented to be unloaded based on unloading priorities assigned by user preference, thereby minimizing data loss and securing insufficient memory space. Furthermore, when approaching an excess of memory capacity as a plurality of web pages are executed, it may be notified to the user in advance and the assigned unloading priorities may be provided to allow the user's selective unloading, thereby providing the user's convenience and enhancing the use efficiency of a web browser.

18 Claims, 9 Drawing Sheets

(56) References Cited

U.S. PATENT DOCUMENTS

| | | | |
|---|---|---|---|
| 2004/0049541 A1* | 3/2004 | Swahn | 709/203 |
| 2004/0066529 A1* | 4/2004 | Wu | G06K 15/02 |
| | | | 358/1.15 |
| 2004/0122873 A1 | 6/2004 | Wright, Jr. et al. | |
| 2004/0139208 A1* | 7/2004 | Tuli | 709/230 |
| 2005/0120385 A1* | 6/2005 | Stalker | G06F 9/44594 |
| | | | 725/134 |
| 2006/0010380 A1* | 1/2006 | Matsuzawa | G06F 9/4443 |
| | | | 715/700 |
| 2007/0136533 A1* | 6/2007 | Church et al. | 711/137 |
| 2008/0184006 A1* | 7/2008 | Moon | G06F 8/4442 |
| | | | 711/205 |
| 2009/0037500 A1* | 2/2009 | Kirshenbaum | G06F 17/30097 |
| 2009/0292671 A1 | 11/2009 | Ramig et al. | |
| 2011/0302524 A1* | 12/2011 | Forstall | G06F 17/30905 |
| | | | 715/781 |
| 2012/0060083 A1* | 3/2012 | Yuan | G06F 17/30899 |
| | | | 715/234 |
| 2012/0090004 A1* | 4/2012 | Jeong | H04N 5/44513 |
| | | | 725/39 |
| 2013/0166819 A1* | 6/2013 | Yerushalmi | G06F 3/0625 |
| | | | 711/103 |
| 2013/0166932 A1* | 6/2013 | Iarovici | G06F 1/3206 |
| | | | 713/323 |
| 2013/0198435 A1* | 8/2013 | Sandadi | G06F 12/126 |
| | | | 711/103 |

* cited by examiner

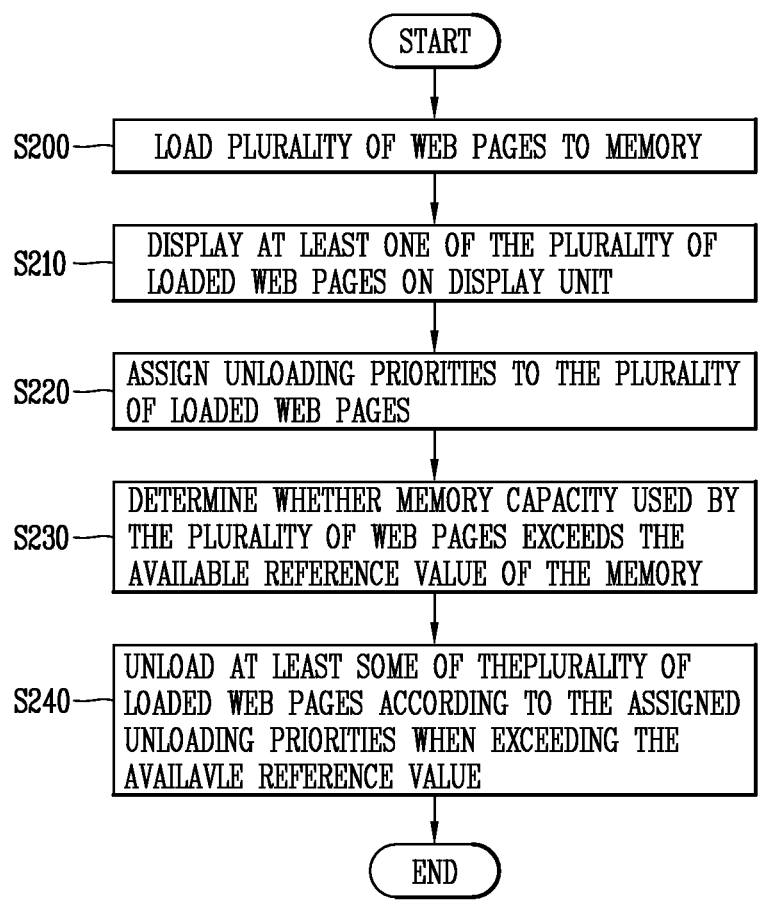

FIG. 5

S320 —
ASSIGN UNLOADING PRIORITIES TO THELOADED WEB PAGES

WEB PAGE UNLOADING PRIORITIES ASSIGNMENT CIRTERIA
- WEB PAGE WITHE THE LONGEST TIME PASSED FROM THE FINALLY USED TIME
- WEB PAGE THAT HAS NOT BEEN ENLARGED OR REDUCED
- WEB PAGE THAT HAS NOT EDITED
- WEB PAGE WITH NO TEXT EDITING OR WITH THE SHORTEST LENGTH OF EDITED TEXT
- WEB PAGE WITH NO USER DRAW IN THE HTML 5 CANVAS
- WEB PAGE WITH THE LEAST NUMBER OF CLICKS
- WHETHER OR NOT THE WEB PAGE IS IN A READ MODE, WEB PAGE WITH THE LONGEST READ TIME

WEB PAGE WITH THE HIGHEST ASSIGNED PRIORITY IS SUBJECT TO UNLOADING

IMAGE DISPLAY DEVICE AND MEMORY MANAGEMENT METHOD OF THE SAME

CROSS-REFERENCE TO RELATED APPLICATION

Pursuant to 35 U.S.C. §119(a), this application claims the benefit of earlier filing date and right of priority to KR Provisional Application No. 10-2012-0055024, filed on May 23, 2012, the contents of which is incorporated by reference herein in its entirety.

BACKGROUND OF THE INVENTION

1. Field of the Invention

The present disclosure relates to an image display device and a memory management method thereof, and more particularly, to an image display device for controlling the unloading of a plurality of loaded web pages according to the assigned unloading priority when a plurality of loaded web pages should be unloaded due to a lack of memory capacity, and a memory management method thereof.

2. Description of the Conventional Art

Image display device is a device having a function of displaying an image shown to the user. The user views broadcasts, videos, images through the image display device.

In recent years, an application occupying a lot of memory capacity such as a web browser is typically operated in an image display device such as a mobile device, a smart TV, and the like. In this case, web pages displayed on the screen by the web browser are typically developed in various ways with no memory restriction, thereby inevitably causing a memory shortage when a plurality of web pages are implemented on the image display device.

On the other hand, in order to solve the memory shortage problem, a memory space is typically secured using a method of collectively unloading the contents of other web pages located on the background excluding a web page located on the foreground currently viewed by the user. However, when a plurality of loaded web pages are collectively unloaded in this manner, even web pages that have been edited by the user or containing key data though located on the background are all removed and as a result, time is consumed since key data is lost or the relevant web page should be loaded and edited again.

SUMMARY OF THE INVENTION

Accordingly, an object of the present disclosure is to provide an image display device for assigning unloading priorities to a plurality of loaded web pages to control the unloading thereof when a plurality of web pages are loaded in an embedded device capable of executing a web browser, and a memory management method thereof, thereby solving memory shortage and minimize data loss.

Furthermore, another object of the present disclosure is to provide an image display device for providing a list of web pages subject to unloading among a plurality of loaded web pages and the execution information to the user and receiving only edited data from web pages to be unloaded or selectively unloading a plurality of loaded web pages in case of memory shortage.

An image display device according to an embodiment of the present disclosure may include a memory; a display unit configured to display at least one of a plurality of web pages loaded to the memory; and a controller configured to assign unloading priorities to the plurality of loaded web pages, and unload at least some of the plurality of loaded web pages according to the assigned unloading priorities when a memory capacity used by the plurality of loaded web pages exceeds an available reference value of the memory.

According to an embodiment, the unloading priorities may be assigned according to a predetermined reference, and the predetermined reference may include at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read.

According to an embodiment, the image display device may further include an interface unit configured to receive an input signal generated through a user input and provide it to the controller, wherein the input signal is an unloading execution mode of the plurality of loaded web pages selected through the user input.

According to an embodiment, the unloading execution mode may include an automatic unloading mode, and the controller may unload the plurality of unloaded web pages according to the assigned unloading priorities until a memory capacity used by the plurality of loaded web pages is less than an available reference value of the memory when an input signal of the automatic unloading mode is applied.

According to an embodiment, the unloading execution mode may include a manual unloading mode, and the controller may generate a list configured with the assigned unloading priorities and the execution information of web pages corresponding thereto and provide the generated list to the display unit when an input signal of the manual unloading mode is applied.

According to an embodiment, the display unit may further display an indicator comprising at least one of whether or not each web page has been edited, an elapsed time subsequent to loading, a used memory capacity, and assigned unloading priorities on a side of the display unit when a plurality of web pages are loaded to the memory.

According to an embodiment, the display unit may further display a memory capacity used by a plurality of loaded web pages or a memory indicator indicating a currently available memory capacity on a side of the display unit.

According to an embodiment, the controller may configure a popup window displayed with a list of web pages to be unloaded according to the assigned unloading priorities and provide the configured popup window to the display unit when a touch input is applied to the memory indicator.

According to an embodiment, the popup window may further display at least one or more execution information on the plurality of loaded web pages and each summary object of an edited web page among the plurality of loaded web pages.

According to an embodiment, the controller may unload the plurality of loaded web pages according to the assigned unloading priorities until a memory capacity used by the plurality of loaded web pages is less than an available reference value of the memory when a long touch input or double tab input is applied to the memory indicator.

According to an embodiment, the controller may detect edited data to store it and then execute the unloading of a web page when the web page to be unloaded includes edited data.

Furthermore, a memory management method of an image display device according to an embodiment of the present disclosure may include executing a web browser to load a plurality of web pages corresponding to a web address received from the user to a memory; displaying at least one of the plurality of loaded web pages on the display unit; assigning unloading priorities to the plurality of loaded web pages; determining whether or not a memory capacity used by the plurality of loaded web pages exceeds an available reference value of the memory; and unloading at least some of the plurality of loaded web pages according to the assigned unloading priorities when the memory capacity of the memory exceeds the available reference value as a result of the determination.

According to an embodiment, the method is characterized in that said unloading at least some of the plurality of loaded web pages includes selecting either one of an automatic unloading mode and a manual unloading mode through a user input; unloading the plurality of loaded web pages according to the assigned unloading priorities until a memory capacity used by the plurality of loaded web pages is less than an available reference value of the memory when the automatic unloading mode is selected; and generating a list configured with the assigned unloading priorities and the execution information of web pages corresponding thereto and providing the generated list to the display unit to unload the user's selected web pages when the manual unloading mode is selected.

According to an embodiment, the method is characterized in that the unloading priorities are assigned according to a predetermined reference, and the predetermined reference includes at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read.

According to an embodiment, the memory management method of an image display device may further include generating a popup window containing a list of web pages subject to unloading according to the assigned unloading priorities and displaying the generated popup window on the display unit when an input signal is received.

According to an embodiment, the method is characterized in that the popup window further displays at least one or more execution information on the plurality of loaded web pages and each summary object of an edited web page among the plurality of loaded web pages.

According to an embodiment, the memory management method of an image display device may further include changing a web page currently displayed on the display unit to a web page corresponding to the summary object when any one of the summary objects is selected.

According to an embodiment, the memory management method of an image display device may further include displaying an indicator comprising at least one of whether or not each web page has been edited, an elapsed time subsequent to loading, a used memory capacity, and assigned unloading priorities on a side of the display unit when a plurality of web pages are loaded to the image display device.

According to an embodiment, the method is characterized in that said assigning unloading priorities to the plurality of loaded web pages includes updating unloading priorities assigned to the loaded web pages containing a new web page when the new web page is loaded.

According to an embodiment, the memory management method of an image display device may further include outputting a memory capacity used by the plurality of loaded web pages to at least one of a screen output means and an audio output means.

According to an embodiment, the method is characterized in that the steps of storing edited web pages among the plurality of loaded web pages; generating each document selector for the edited web pages and displaying the each document selector on the display unit; and containing the edited content of a web page corresponding to the selected document selector in a web page currently displayed on the display unit when any one of the document selectors is selected, are further carried out, prior to unloading at least some of the plurality of loaded web pages.

According to an embodiment, the method is characterized in that the step of detecting edited data to store it is further carried out when a web page to be unloaded contains the edited data is further carried out, prior to unloading at least some of the plurality of loaded web pages.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is an exemplary flow chart illustrating a memory management method of an image display device according to an embodiment of the present disclosure;

FIG. 5 is a view illustrating an exemplary assignment reference of unloading priorities in FIG. 4;

DETAILED DESCRIPTION OF THE INVENTION

Figure 1:
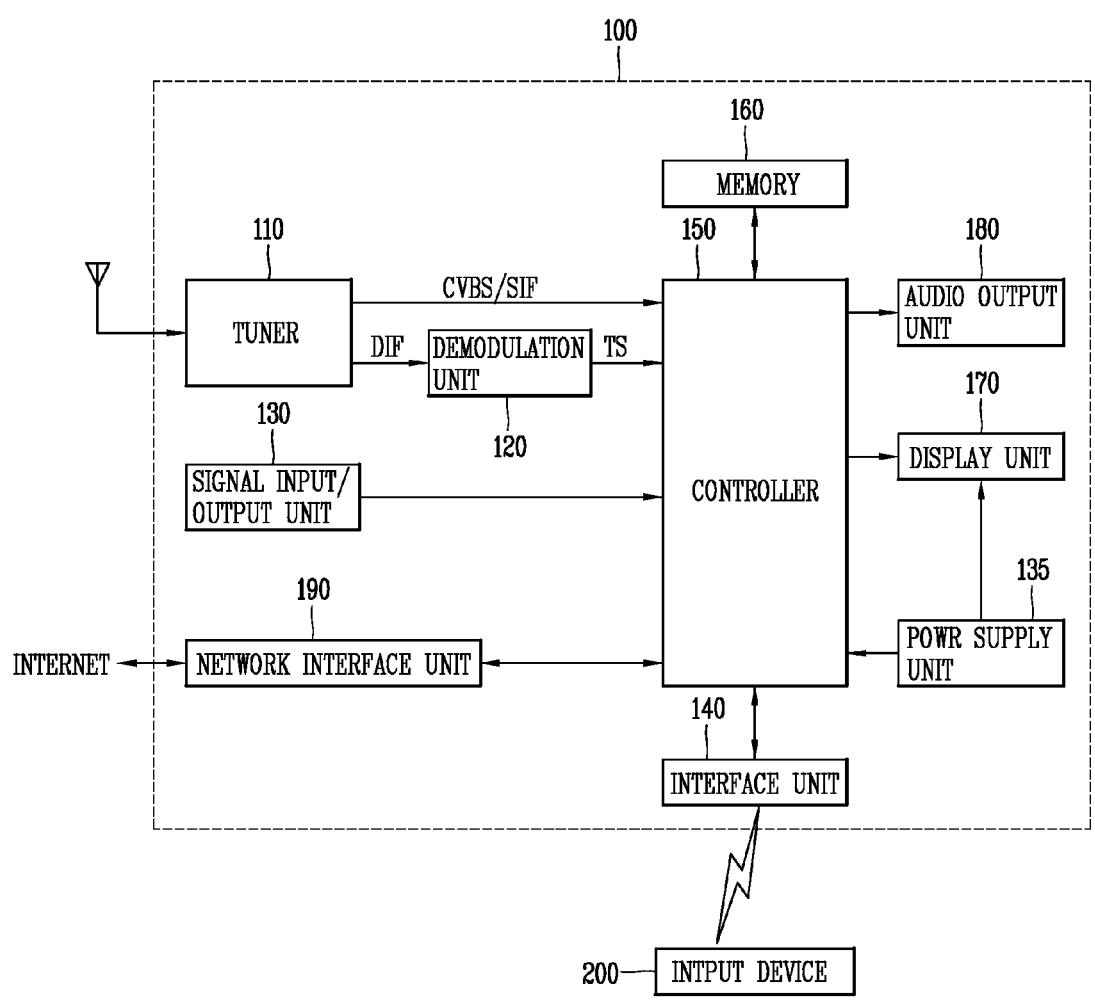
FIG. 1 is a block diagram illustrating the detailed configuration of an image display device according to an embodiment of the present disclosure.

Hereinafter, an image display device and a memory management method thereof according to the embodiments of the present disclosure will be described in detail with reference to the accompanying drawings.

Here, the embodiments of the present disclosure may be implemented in various different forms, and may not be limited to the embodiments illustrated therein. In order to clearly describe the present invention, parts not related to the description are omitted, and like reference numerals designate like constituent elements throughout the specification.

As an intelligent image display device in which a computer supporting function is added to a broadcast receiving function, according to the image display device disclosed herein, an Internet function or the like may be added thereto while supporting the broadcast receiving function, thereby providing an interface convenient for use such as a handwriting input device, a touch screen, a space remote controller or the like. Furthermore, it may be connected to the Internet or computer with the support of wired or wireless Internet functions, thereby performing a function such as e-mail, web browsing, banking, game or the like. A standardized general purpose OS may be used for such various functions. In other words, an image display device disclosed therein may perform various user friendly functions since various applications can be freely added or removed on a general purpose OS kernel. Furthermore, an image display device according to an embodiment of the present disclosure may include a smart TV, a web phone, a PDA, a hand phone, and the like. Hereinafter, a smart TV will be taken as an example to describe an embodiment according to the present disclosure.

First, the configuration of a smart TV will be described below as an example of an image display device according to an embodiment of the present disclosure.

FIG. 1 is a block diagram illustrating an image display device 100 and an input device 200 according to an embodiment of the present disclosure. Referring to FIG. 1, the image display device 100 may include a tuner 110, a demodulation unit 120, a signal input/output unit 130, a power supply unit 135, an interface unit 140, a controller 150, a memory 160, a display unit 170, an audio output unit 180, and a network interface unit 190. Here, the image display device 100 may not be limited to the constituent elements disclosed herein, and may be also implemented by excluding some of the foregoing constituent elements or additionally including other constituent elements.

In an embodiment according to the present disclosure, the image display device 100 may include the memory 160 configured to load a plurality of web pages corresponding to a web address received by the execution of a web browser, the display unit 170 configured to display at least one of a plurality of web pages loaded to the memory 160, and the controller 150 configured to assign unloading priorities to the plurality of loaded web pages, and unload at least some of the plurality of loaded web pages according to the assigned unloading priorities when a memory capacity used by the plurality of loaded web pages exceeds an available reference value of the memory 160.

Here, the unloading priorities are assigned according to a predetermined reference, and the predetermined reference may include at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read. Furthermore, an unloading execution mode selected through the user's input may include an automatic unloading mode, and the controller 150 unloads the plurality of unloaded web pages according to the assigned unloading priorities until a memory capacity used by the plurality of loaded web pages is less than an available reference value of the memory 160 when an input signal of the automatic unloading mode is applied. Moreover, an unloading execution mode selected through the user's input may include a manual unloading mode, and the controller 150 generates a list configured with the assigned unloading priorities and the execution information of web pages corresponding thereto and provides the generated list to the display unit 170 when an input signal of the manual unloading mode is applied.

The tuner 110 selects a radio frequency (RF) broadcast signal corresponding to a channel selected by the user among radio frequency (RF) broadcast signals received through an antenna, and converts the RF broadcast signal into an intermediate frequency signal or baseband video/audio signal.

For example, when the RF broadcast signal is a digital broadcast signal, the tuner 110 converts the RF broadcast signal into a digital IF signal (DIF). On the contrary, when the RF broadcast signal is an analog broadcast signal, the RF broadcast signal is converted into an analog baseband video/audio signal (CVBS/SIF). Furthermore, the tuner 110 may be a hybrid tuner capable of processing digital broadcast signals and analog broadcast signals.

The digital IF signal (DIF) outputted from the tuner 110 may be input to the demodulation unit 120, and the analog baseband video/audio signal (CVBS/SIF) outputted from the tuner 110 may be input to the controller 150. Furthermore, the tuner 110 may receive RF broadcast signals with a single carrier according to the Advanced Television System Committee (ATSC) method or receive RF broadcast signals with multiple carriers according to the Digital Video Broadcasting (DVB) method.

Though one tuner 110 is illustrated in the drawing, but it will not be limited to this, and an image display device 100 according to an embodiment of the present disclosure may include a plurality of tuners, for example, a first tuner and a second tuner. In this case, the first tuner may receive a first RF broadcast signal corresponding to a broadcast channel selected by the user, and the second tuner may sequentially or periodically receive a second RF broadcast signal corresponding to a prestored broadcast channel. The second tuner may convert the RF broadcast signal into a digital IF signal (DIF) or analog baseband video/audio signal (CVBS/SIF) in a manner similar to the first tuner.

The demodulation unit 120 receives the digital IF signal (DIF) converted in the tuner 110 to perform demodulation. For example, when the digital IF signal (DIF) outputted from the tuner 110 is an ATSC method, the demodulation unit 120 performs 8-Vestigal Side Band (8-VSB) demodulation. At this time, the demodulation unit 120 may perform channel decoding such as Trellis decoding, de-interleaving, Reed Solomon decoding or the like. To this end, the demodulation unit 120 may include a Trellis decoder, a de-interleaver, a Reed Solomon decoder, or the like.

For another example, when the digital IF signal (DIF) outputted from the tuner 110 is a DVB method, the demodulation unit 120 performs Coded Orthogonal Frequency Division Modulation (COFDMA) demodulation. At this time, the demodulation unit 120 may perform channel decoding such as convolution decoding, de-interleaving, Reed Solomon decoding or the like. To this end, the demodulation unit 120 may include a convolution decoder, a de-interleaver, a Reed Solomon decoder, or the like.

Furthermore, a stream signal outputted from the demodulation unit 120 may be input to the controller 150. Then, the controller 150 that has received the stream signal performs inverse multiplexing, video/audio signal process, and the like, and then outputs video to the display unit 170, and outputs audio to the audio output unit 180.

The signal input/output unit 130 is connected to an external device to perform video and audio signal input and output, and to this end, the signal input/output unit 130 may include an A/V input/output unit (not shown) and/or a wireless communication unit (not shown).

Here, the A/V input/output unit may include an Ethernet terminal, a USB terminal, a composite video banking sync (CVBS) terminal, a component terminal, a S-video terminal (analog), a digital visual interface (DVI) terminal, a high definition multimedia interface (HDMI) terminal, a mobile high-definition link (MHL) terminal, a RGB terminal, a D-SUB terminal, an IEEE 1394 terminal, a SPDIF terminal, a liquid HD terminal, and the like. A digital signal received through the above terminals is transferred to the controller 150.

Furthermore, the wireless communication unit may perform near field communication with another electronic device. For example, wireless communication unit may perform near field communication using Bluetooth, Radio Frequency Identification (RFID), Infrared Data Association (IrDA), Ultra Wideband (UWB), Zigbee, or the like. Furthermore, the signal input/output unit 130 transfers video, audio and data signals provided from an external device such as a digital versatile disk (DVD) player, a Blu-ray player, a game player, a camcorder, a computer (notebook), a portable device, a smart phone, and the like to the controller 150. Furthermore, the signal input/output unit 130 transfers video, audio and data signals in various media files stored in an external storage device such as a memory device, a hard disk drive, and the like, to the controller 150. Furthermore, the signal input/output unit 130 may output video, audio and data signals processed by the controller 150 to another external device.

Furthermore, the signal input/output unit 130 may be connected to a set-top box for Internet Protocol TV (IPTV), for example, through at least one of the foregoing terminals to perform a signal input and output operation. For example, the signal input/output unit 130 may transfer video, audio and data signals processed by the set-top box for IPTV to the controller 150 and transfer signals processed by the controller 150 to the set-top box for IPTV to enable bidirectional communication. Here, IPTV may include ADSL-TV, VDSL-TV, FTTH-TV, and the like that are classified according to the transmission network.

The network interface unit 190 provides an interface for connecting the image display device 100 according to an embodiment of the present disclosure to a wired/wireless network including an Internet network. The network interface unit 190 may include an Ethernet terminal or the like to connect to a wired network, or use Wireless LAN (WLAN/Wi-Fi), Wireless broadband (Wibro), World Interoperability for Microwave Access (Wimax), High Speed Downlink Packet Access (HSDPA) communication standards, and the like to connect to a wireless network.

Furthermore, the network interface unit 190 may connect to a predetermined web page through a network. In other words, a predetermined web page may be connected through a network to transmit and/or receive data to and/or from the relevant server. Moreover, the network interface unit 190 may receive contents such as movies, advertisements, games, VODs, broadcast signals and the like that are provided from a content provider or network provider through a network and information associated therewith. Furthermore, the network interface unit 190 may receive the update information and update files of firmware provided by a network operator. Furthermore, the network interface unit 190 may transmit data to a content provider or network operator.

Moreover, the network interface unit 190 may select and receive a desired application among applications open to the public through a network.

The interface unit 140 receives input signals corresponding to power control, channel selection, screen setting, unloading execution modes of a plurality of web pages (including an automatic unloading mode and a manual unloading mode which will be described below), user selection of a web page to be unloaded, and the like, for example, from the input device 200.

Furthermore, the interface unit 140 may transmit signals processed by the controller 150 to the input device 200. Here, the interface unit 140 and input device 200 may be connected through wired or wireless connections.

On the other hand, when the display unit 170 of the image display device 100 according to the present disclosure is a layered touch screen having a multi-touch function, the interface unit 140 receives an input signal by sensing a touch to a predetermined region and/or point on the display unit 170, and thus it is not required to be connected to the input device 200 or to receive the input signal therefrom.

The controller 150 controls the entire operation of the image display device 100. For example, the controller 150 may control the tuner 110 to tune a RF broadcast signal corresponding to the user's selected channel or prestored channel. Though not shown in the drawing, the controller 150 may include a demultiplexing unit, an image processing unit, a data processing unit, an On Screen Display (OSD) generation unit, and the like to process the RF broadcast signal.

Furthermore, the controller 150 may demultiplex a stream signal (TS), for example, MPEG-2 TS, to divide into audio and data signals.

Furthermore, the controller 150 may perform image processing, for example, decoding, on the demultiplexed image signals. More specifically, the controller 150 may decode the image signals encoded based on the MPEG-2 standard using an MPEG-2 decoder, and decode image signals encoded based on the H.264 standard according to a Digital Multimedia Broadcasting (DMB) scheme or DVB-H using an H.264 decoder.

Furthermore, the controller 150 may perform image processing to control the brightness, tint, color of an image signal. The image signal image-processed by the controller 150 may be transferred to the display unit 170 or transferred to an external output device (not shown) through an external output terminal.

Furthermore, the controller 150 may perform audio processing, for example, decoding, on the demultiplexed audio signal. More specifically, the controller 150 may decode audio signals encoded based on the MPEG-2 standard using an MPEG-2 decoder, decode audio signals encoded based on the MPEG 4 Bit Sliced Arithmetic Coding (BSAC) standard according to a DMB scheme using an MPEG 4 decoder, and decode audio signals encoded based on the MPEG 2 Advanced Audio Codec (AAC) standard according to a satellite DMB scheme or DVB-H using an AAC decoder. Furthermore, the controller 150 may process base, treble, volume control and the like. In this manner, audio signals processed by the controller 150 may be transferred to the audio output unit 180, for example, a speaker, or transferred to an external output device.

Furthermore, the controller 150 may perform signal processing on the analog baseband video/audio signal (CVBS/

SIF). Here, the analog baseband video/audio signal (CVBS/SIF) input to the controller 150 may be an analog baseband video/audio signal (CVBS/SIF) output from the tuner 110 or signal input/output unit 130. In this manner, image signals signal-processed by the controller 150 are displayed through the display unit 170, and the signal-processed audio signals are output through the audio output unit 180. Furthermore, the controller 150 may perform data processing, for example, decoding, on the demultiplexed data signals. Here, the data signals may include Electronic Program Guide (EPG) information including broadcasting information such as a start time, an end time, and the like, of the broadcast program broadcasted from each channel. The EPG information may include ATSC-Program and System Information Protocol (TSC-PSIP) information in the ATSC scheme, and may include DVB-Service Information (DVB-SI) information in the DVB scheme, for example. The ATSC-PSIP information or DVB-SI information may be contained in a header (4 bytes) of MPEG-2 TS.

Furthermore, the controller 150 may perform an control operation for OSD processing. More specifically, the controller 150 may generate an OSD signal for displaying various information in the form of a graphic or text based on at least one of an image signal and a data signal or an input signal received from the input device 200. Here, the OSD signal may include various data, such as a user interface screen, a menu screen, a widget, an icon, and the like, on the image display device 100.

Furthermore, the controller 150 may execute a web browser to sense a memory capacity used by a plurality of loaded web pages. Furthermore, when the sensed memory capacity exceeds or approaches a predetermined available reference value, the controller 150 may notify it to the user through the audio output unit 180 and/or display unit 170.

Furthermore, the controller 150 unloads at least some of a plurality of previously loaded web page according to an unload execution mode (automatic unloading mode, manual unloading mode) corresponding to the input signal received by the interface unit 140.

The memory 160 stores a program for the signal processing and control of the controller 150 or stores the signal-processed video, audio and data signals.

Furthermore, a web page corresponding to a web address received by executing a web browser, address information of the relevant web page, and/or web page generation data, web data (HTML, Java Script, CSS, image, etc.) and the like are loaded to the memory 160. Furthermore, the memory 160 further stores an edited web page (or URL of the web page) among a plurality of loaded web pages.

Furthermore, the memory 160 may include at least any one of storage media including flash memory, hard disk, a multimedia card micro type, a card type memory (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like.

The display unit 170 converts video signals, data signals, OSD signals, and the like, processed by the controller 150, into RGB signals to generate a drive signal. Furthermore, the display unit 170 executes a web browser to display at least one of a plurality of web pages loaded to the memory 160. Furthermore, the display unit 170 may display only one web page being currently used among the plurality of loaded web pages, or display a plurality of web pages in a collective manner.

The display unit 170 may be implemented in various ways such as Plasma Display Panel (PDP), Liquid Crystal Display (LCD), Thin Film Transistor-LCD (TFT-LCD), Organic Light Emitting Diode (OLED), a flexible display, a three-dimensional (3D) display, and an e-ink display, and the like.

Furthermore, when a touch sensor is configured with a touch screen having an interlayer structure, the display unit 170 may also perform an input device. In this case, the touch sensor may be implemented by sensing a change of pressure applied to a specific portion of the display unit 170, or a change of capacitance generated from a specific portion thereof to convert it into an electric input signal. In this manner, when there is a touch input to the touch sensor, the corresponding signal(s) are sent to a touch controller (not shown). The touch controller transmits the corresponding data obtained by processing the signal(s) to the controller 150. Then, the controller 150 may sense which region of the display unit 170 has been touched.

The audio output unit 180 outputs audio signals, for example, stereo signals or 5.1 channel signals processed by the controller 150. The audio output unit 180 may be implemented with various types of speakers. Furthermore, the audio output unit 180 may receive a signal indicating whether or not the memory 160 exceeds an available reference value sensed by the controller 150, and output an alarm when exceeding the available reference value, for example.

The input device 200 is connected to the interface unit 140 through wired or wireless connections to transmit input signals generated according to a user input to the interface unit 140. The input device 200 may be implemented by an external input device including a remote control device, a mouse, a keyboard and the like or an internal input device of the image display device 100.

More specifically, the remote control device transmits an input signal generated according to a user input to the interface unit 140 through Bluetooth, RF communication, infrared communication, Ultra Wideband (UWB), Zigbee schemes, and the like. Furthermore, the remote control device may be implemented by a space remote control device. Here, the space remote control device senses the operation of a main body in a space to generate an input signal.

On the other hand, when the display unit 170 is implemented with a touch screen as described above to perform the function of an input device, the input device 200 connected to the interface unit 140 may be omitted.

The power supply unit 135 supplies power to the entire image display device 100. In particular, the power supply unit 135 supplies power to the controller 150 that can be implemented in the form of a System On Chip (SOC), the display unit 170 for displaying an image, and the audio output unit 180 for outputting audio. To this end, the power supply unit 135 may be provided with a converter (not shown) for converting alternating current power to direct current power. On the other hand, when the display unit 170 is implemented with a liquid crystal panel having a plurality of backlight lamps, an inverter (not shown) capable of PWM operation may be further provided to drive brightness variation or dimming.

The image display device 100 may be implemented by a fixed type digital broadcast receiver capable of receiving at least one of digital broadcasting in an ATSC mode (8-VSB mode), digital broadcasting in a DVB-T mode (COFDM mode), and digital broadcasting in an ISDB-T mode (BST-OFDM mode). Furthermore, the image display device 100 may be implemented by a mobile type digital broadcast receiver capable of receiving at least one of digital broadcasting in a terrestrial DMB mode, digital broadcasting in a satellite DMB mode, and digital broadcasting in an ATSC-MH mode, digital broadcasting in a DVB-H mode (COFDM mode), and digital broadcasting in a Media Forward Link Only (MediaFLO) mode. Furthermore, the image display device 100 may be implemented with digital broadcast receivers for cable, satellite communication, and IPTV.

Furthermore, the image display device 100 according to an embodiment of the present disclosure may be a portable phone, a smart phone, a digital broadcast terminal, a personal digital assistant (PDA), a portable multimedia player (PMP), and the like, which are configured by further including multiple sensors, a wireless Internet module, an output device, a camera, and the like in addition to the foregoing constituent elements.

For example, the image display device 100 may further include one or more cameras (not shown), and image data captured through the cameras is transferred to the controller 150 for processing. Furthermore, the image display device 100 may further include a sensor unit (not shown) with at least one of a touch sensor, a voice sensor, a position sensor, an operation sensor for sensing the user's operation, and signals sensed through the sensor unit can be transferred to the controller 150 through the interface unit 140. Moreover, the block diagram of the image display device 100 illustrated in FIG. 1 is a block diagram for explaining the embodiments of the present disclosure, and each element may be added, incorporated or omitted according to the specification of the image display device 100 actually implemented.

Figure 2A:
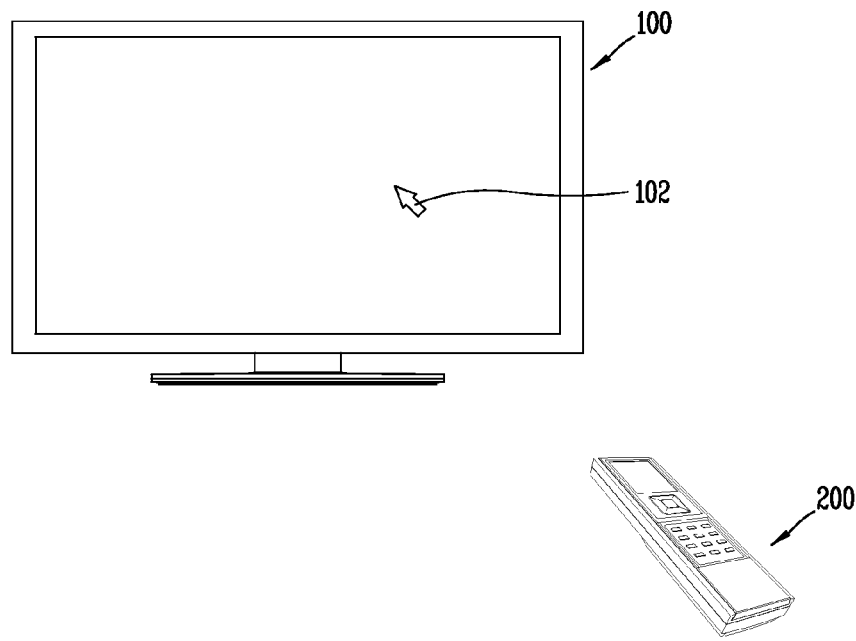
FIGS. 2A and 2B are conceptual views illustrating an interaction between an image display device and an external input device according to an embodiment of the present disclosure.
Figure 2B:
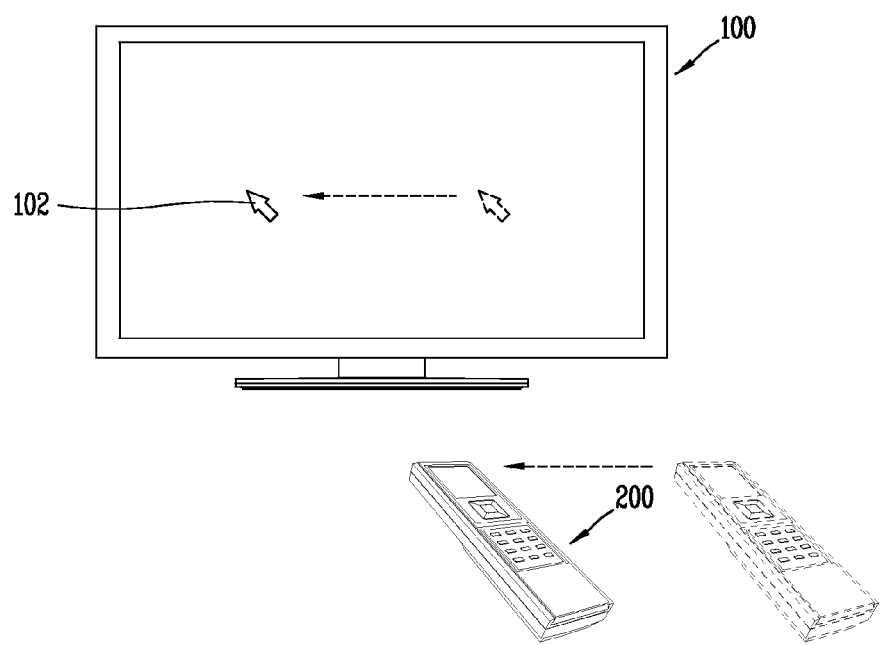

FIGS. 2A and 2B illustrate an interaction between the image display device 100 and the input device 200 associated with the present disclosure. Here, a TV receiver is illustrated as an example of the image display device 100 and a space remote control device is illustrated as an example of the input device 200, but it is only for illustration, and the image display device 100 and input device 200 are not limited to such examples as described in the above.

Referring to FIGS. 2A and 2B, the input device 200 may transmit or receive signals to or from the image display device 100 according to the RF communication standard. Furthermore, at least one or more pointers 102 controlled according to a control signal of the input device 200 may be displayed on the screen of the image display device 100. Furthermore, the input device 200 may sense movement or rotation in the up/down, left/right, and forward/backward directions to generate the corresponding input signals. To this end, the input device 200 may include a sensor for sensing movement. Furthermore, the input device 200 may include a plurality of buttons to generate a predetermined input signal according to the manipulation of the buttons.

On the other hand, when the image display device 100 according to an embodiment of the present disclosure is a mobile terminal including a touch screen, such as a portable phone, PDA, and the like, an input unit (not shown) may be provided within the image display device 100 or an input signal may be generated according to an input applied to the touch screen.

Hereinafter, a memory management method of the foregoing image display device will be described in more detail with reference to FIGS. 1 through 3.

First, the image display device 100 executes a web browser to load a plurality of web pages corresponding to the received web address (S200), and displays at least one of the plurality of loaded web pages on the display unit 170 (S210).

At this time, the plurality of loaded web pages may be displayed to perform a screen switching function between web documents, for example, by arranging layers for several web documents to be overlapped with one another on the screen, and displaying only one of the layers on the screen, and processing the remaining layers to be transparent. In other words, a web page that has been loaded most recently or a web page currently being used by the user is displayed on a front surface of the display unit 170. On the other hand, according to another embodiment, two or more loaded web pages may be displayed in a collective manner on one display unit 170.

On the other hand, the information of a memory capacity used by a plurality of loaded web pages may be further displayed on the display unit 170. Here, the information of the memory capacity may be displayed in a detailed quantity or a ratio of currently remaining available memory capacity to a total memory capacity may be displayed in a chart, diagram or the like. However, it may not be limited to this, and the information of the memory capacity may be also displayed in any method that can be recognized by the user.

Furthermore, the information of the memory capacity may be displayed in real time, and may be also notified to the user through various means such as color change or blinking on at least part of the display unit 170, sound alarm by means of the audio output unit 180, and the like when the memory capacity of the memory used by a plurality of loaded web pages exceeds or approaches an available reference value.

Then, the image display device assigns unloading priorities to the plurality of loaded web pages (S220). According to an embodiment, the unloading priorities are assigned based on a predetermined reference, and the predetermined reference may include at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read. For example, when a specific web page is a web page that has not been edited or is the oldest from the finally used time, the controller 150 assigns a high unloading priority to the relevant web page.

More specifically, when a plurality of web pages are loaded to cause a lack of memory space and thus one or more web pages should be unloaded by necessity, unloading priorities of a plurality of loaded web pages are assigned in the order of a web page having the oldest elapsed time from the finally used time, a web page that has not been enlarged or reduced, a web page that has not been edited, a web page that has been edited but with no text editing, a web page with a short edited text length, and a web page on which a user draw is not performed in the HTML 5 canvas. Furthermore, a low unloading priority is assigned to a web page with a small number of clicks, a read-only web page, or a web page with a short total read time of the read-only web page. The assigned unloading priority may be automatically updated when a new web page is loaded or a previous web page is unloaded. Furthermore, the previously assigned unloading priority may be increased or decreased when text editing is newly performed or enlargement/reduction is performed on the loaded web page. The unloading priorities assigned to a plurality of loaded web pages may be displayed on a side of the display unit 170 to be recognized by the user.

Then, it is determined whether or not a memory capacity used by a plurality of loaded web pages exceeds an available reference value of the memory 160 (S230). At this time, the memory capacity used by the plurality of loaded web pages is sensed by the controller 150, and the available reference value may be predetermined during the initial installation or may be an allowable memory capacity determined by the user's setting.

As a result of the determination, when a memory capacity used by the plurality of loaded web pages exceeds an available reference value, at least some of the plurality of web pages loaded according to the assigned unloading priorities are unloaded (S240). The plurality of loaded web pages are automatically unloaded from web pages having higher assigned unloading priorities. At this time, it may be implemented such that a web page currently displayed on the display unit 170 may be excluded from the unloading priorities. Furthermore, when there are a plurality of loaded web pages, the plurality of loaded web pages may be repeatedly unloaded until the memory of the image display device is less than an available reference value.

Furthermore, the unloading of a plurality of loaded web pages may be automatically carried out when a predetermined condition is satisfied, for example, when exceeding an available reference value, but may be also selectively carried out even prior to exceeding the available reference value according to the user input. In this case, it may be possible to provide an indicator containing the execution information of a plurality of loaded web pages and a popup window displayed with the unloading priorities of the corresponding web pages on the display unit 170. Then, one or a plurality of web pages may be selectively unloaded based on information displayed on the popup window through a user input.

According to an embodiment, the controller 150 of the image display device 100 may store web pages being edited prior to performing unloading on web pages, and generate document selectors associated with web pages being edited, respectively, to display them on the display unit 170. In other words, all loaded web pages excluding a web page displayed on the display unit 170 may be unloaded but may be also unloaded subsequent to automatically storing key data, for example, edited text documents. At this time, when any one of the document selectors is selected, the edited content of a web page corresponding to the relevant document selector among prestored edited web pages is enabled to be contained in a web page currently displayed on the 170, thereby allowing the user to continuously perform editing. According to another embodiment, when a web page to be unloaded contains edited data, only the edited data may be detected and stored in the memory 160.

According to the foregoing embodiments, even when exceeding an allowable memory space, a plurality of web pages may not be unloaded in a collective manner but unloaded in a sequential manner according to data priority, thereby minimizing data loss and securing insufficient memory space.

Figure 4:
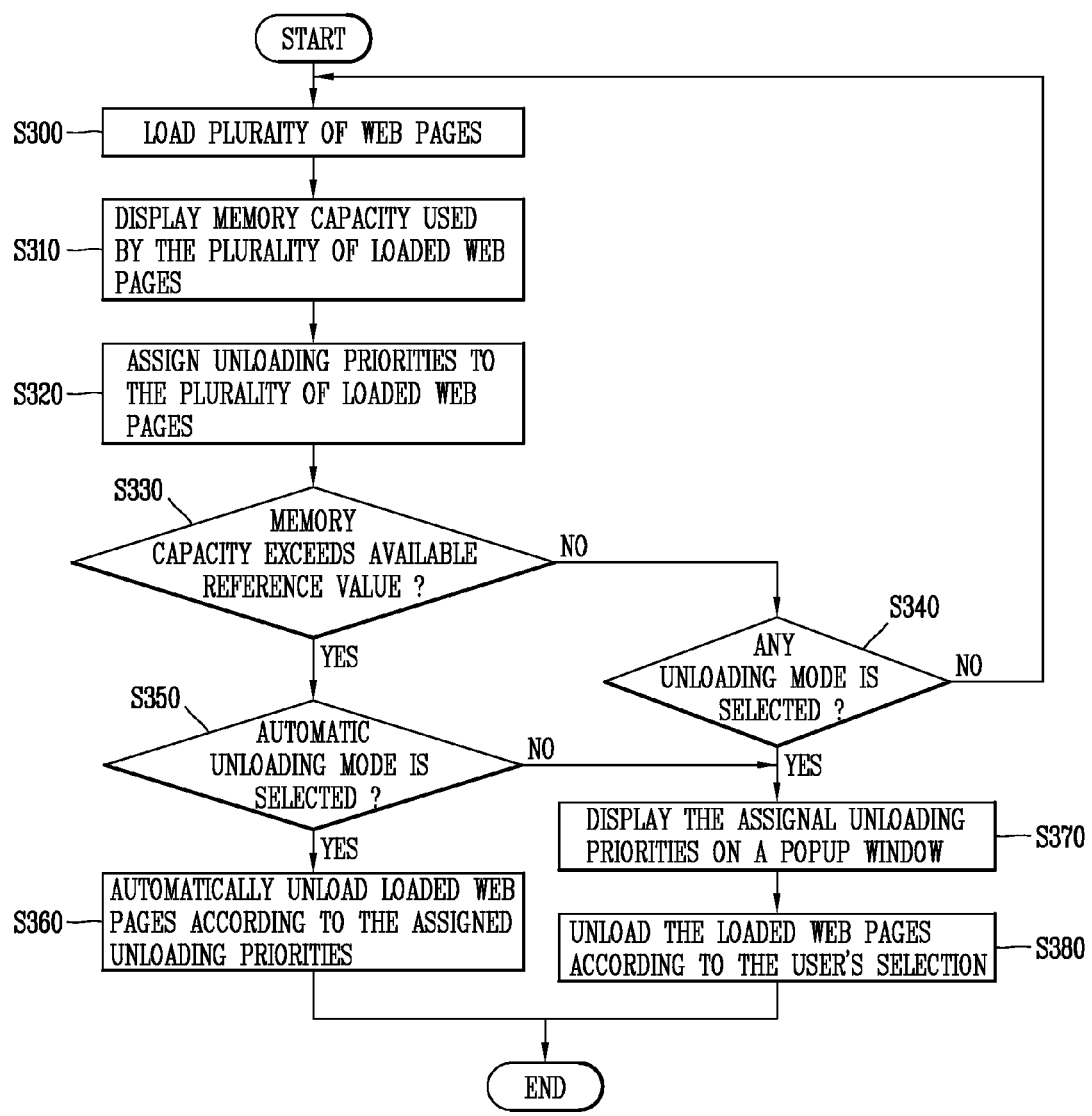
FIG. 4 is another exemplary flow chart illustrating a memory management method of an image display device according to an embodiment of the present disclosure.

FIG. 4 is another exemplary flow chart illustrating a memory management method of an image display device according to an embodiment of the present disclosure.

First, the image display device executes a web browser to load a plurality of web pages to the memory (S300). At this time, a most recently loaded web page, for example, may be displayed on the foreground of the display unit 170.

A memory capacity of the memory 160 used by a plurality of loaded web pages is displayed on the display unit 170 (S310). According to an embodiment, the display of the used memory amount may be implemented by displaying a total memory capacity used by a plurality of currently loaded web pages to a total memory capacity or displaying a "memory indicator" indicating a currently remaining available memory capacity on a side of the display unit 170. More specifically, the memory indicator may be a text for displaying a memory capacity being used in a detailed quantity, or a chart, diagram, an image, or the like, indicating a ratio of currently available memory capacity to a total memory capacity. However, it may not be limited to the above-mentioned examples, and the information of the memory capacity may be also implemented in any method that can be visually recognized by the user. Furthermore, the memory indicator may be always displayed on a side of the display unit 170 or displayed when located at a point within a predetermined region of the display unit 170 according to a control signal input to the input device 200, or displayed only when there is a user input.

On the other hand, according to an embodiment, the interface unit 140 receives an input signal generated through the user input and provide it to the controller 150, and the input signal may include an unloading execution mode for the plurality of loaded web pages. The unloading execution mode may include an automatic unloading mode and a manual unloading mode as described below.

When an input signal of the manual unloading mode is applied, the controller 150 generates a list configured with the assigned unloading priorities and the execution information of web pages corresponding thereto and provides the generated list to the display unit 170.

Furthermore, according to an embodiment, when a touch input is applied to the memory indicator, the controller 150 may generate a popup window displayed with a list of web pages to be unloaded according to the assigned unloading priorities and display the generated popup window on the display unit 170. Then, the user selectively unloads at least some of a plurality of loaded web pages using information contained in the popup window. On the other hand, when the display unit 170 is not formed of a touch screen, the controller 150 may generate a popup window for displaying a list of web pages to be unloaded according to an input signal applied through the input device 200 (refer to FIG. 1).

When an input signal of the automatic unloading mode is applied, the controller 150 unloads the plurality of unloaded web pages according to the assigned unloading priorities until a memory capacity used by the plurality of loaded web pages is less than an available reference value of the memory.

Furthermore, according to an embodiment, when a long touch input or double tab input is applied to the memory indicator, an automatic unloading mode for automatically unloading a plurality of web pages loaded according to the assigned unloading priorities may be carried out. In other words, even when a plurality of web pages are unloaded but the memory capacity does not exceed an available reference value, a simple input signal is provided to perform the automatic unloading mode as the need arises. On the other hand, when the display unit 170 is not formed of a touch screen, it may be possible to perform the automatic unloading mode according to an input signal applied through a key button of the input device 200 (refer to FIG. 1).

Then, the image display device assigns unloading priorities to a plurality of loaded web pages (S320). Here, the unloading priorities are assigned based on a predetermined reference, and the predetermined reference may include at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for the web page has been read.

Regarding this, FIG. 5 is a view illustrating an exemplary assignment reference of unloading priorities for plurality of loaded web pages. As illustrated in the drawing, a relatively high unloading priority is assigned to a web page having the oldest elapsed time from the finally used time, a web page that has not been enlarged or reduced, a web page that has not been edited, a web page with no text editing, or a web page that has been edited but has a short edited text length. Furthermore, the relatively high unloading priority is also assigned to a web page on which a user draw is not performed in the HTML 5 canvas, a web page with a small number of clicks subsequent to loading, and a read-only web page. Furthermore, a relatively low unloading priority is assigned to a web page that has been read for the longest time, a web page with a short elapsed time from the finally used time, a web page that has been frequently enlarged or reduced, and a web page with a long edited text length, for example. In this manner, a relatively low unloading priority is assigned to web pages containing data with a high priority, and the unloading of the plurality of loaded web pages is carried out from web pages with a high unloading priority assigned thereto.

On the other hand, as a result of determining whether the memory capacity exceeds an available reference value (S330), an unloading execution mode for a plurality of loaded web pages selected through a user input is first determined when exceeding the available reference value (S350). In other words, when the unloading execution mode selected though the user input is an automatic unloading mode, a plurality of loaded web pages are automatically unloaded according to the assigned unloading priorities (S360). At this time unloading can be repeatedly performed until a memory capacity used by the remaining web pages is less than an available reference value.

On the other hand, as a result of the determination in the step S350, when the unloading execution mode selected through the user input is a manual unloading mode, a popup window containing a list configured with the assigned unloading priorities and web pages corresponding thereto is generated, and displayed on the display unit 170 (S370). Then, the user selects a web page to be unloaded using information contained in the provided popup window, and one or a plurality of loaded web pages are unloaded according to an input signal corresponding to the user selection (S380). Here, either one of an automatic unloading mode and a manual unloading mode may be selected through a user input (for example, a touch input or an input through the input device) in advance prior to performing the foregoing steps.

On the other hand, when it is selected to perform any unloading mode through the user input even though there is a free space in the memory 160 in the step S330 (S340), a popup window configured with the assigned unloading priorities and web pages corresponding thereto is displayed on the display unit 170 (S370). Here, the popup window may further display one or more execution information on the loaded web pages, for example, a title of web page, whether or not the login has been executed, whether or not the video has been executed, and the like. Furthermore, the popup window may further display the summary objects of an edited web page among a plurality of loaded web pages.

Here, the summary object may include any one of a representative image, a thumbnail image, and an icon capable of immediately identifying the edited web page in a visual manner.

According to an embodiment, the method may include the steps of storing edited web pages among the plurality of loaded web pages, generating each document selector for the edited web pages and displaying the each document selector on the display unit, and containing the edited content of a web page corresponding to the selected document selector in a web page currently displayed on the display unit 170 when any one of the document selectors is selected, prior to unloading at least some of a plurality of loaded web pages. Furthermore, according to an embodiment, the method may further include the step of detecting edited data to store it when a web page to be unloaded contains the edited data, prior to unloading at least some of the plurality of loaded web pages.

Figure 6:
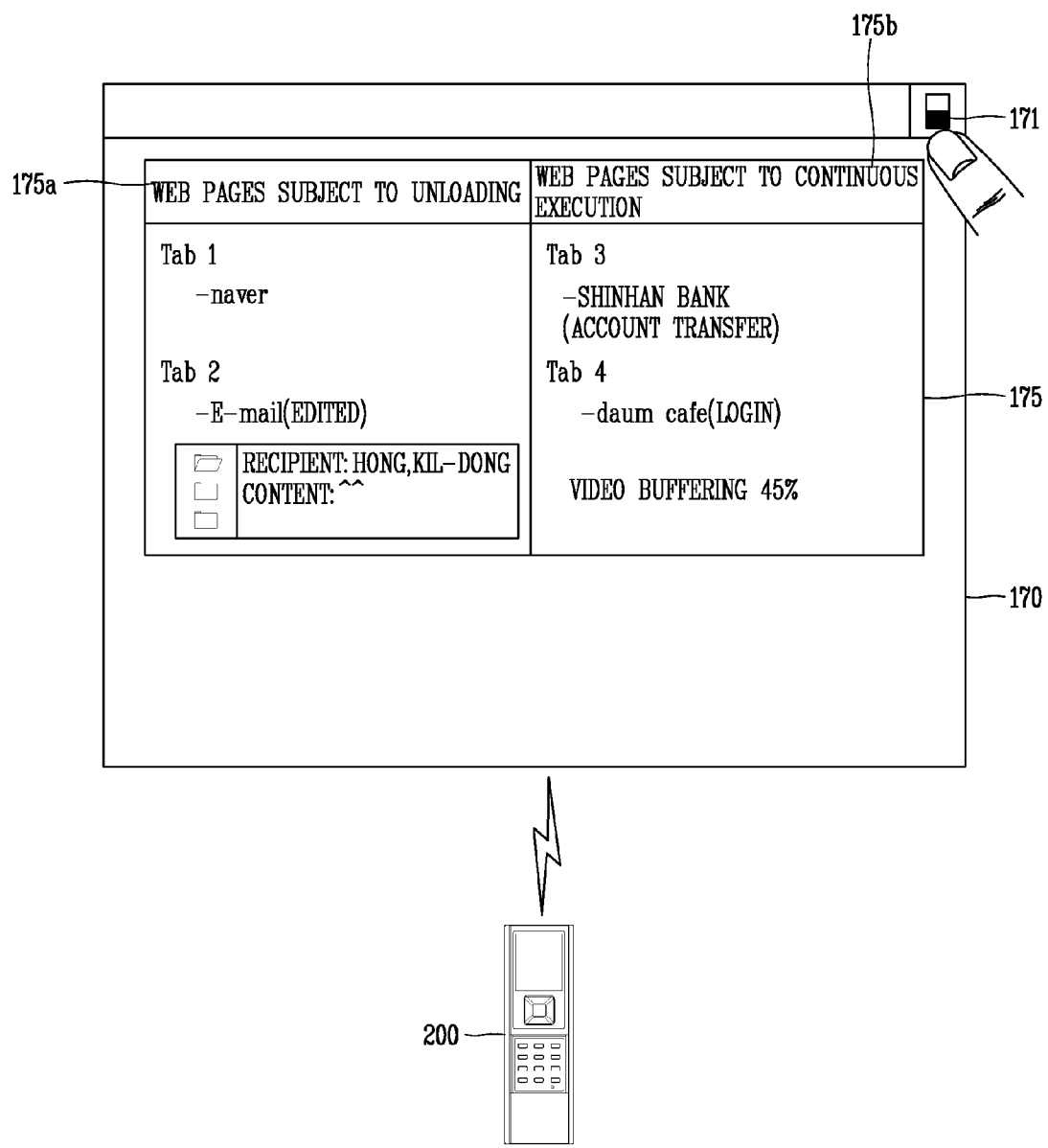
FIG. 6 is a screen configuration view illustrating a popup window containing a list of web pages to be unloaded according to an embodiment of the present disclosure.

FIG. 6 illustrates a popup window 175 containing a list of web pages to be unloaded, which is displayed on the display unit 170, according to an embodiment of the present disclosure.

First, a memory indicator 171 indicating a ratio of memory capacity occupied by a plurality of currently loaded web pages or currently remaining available memory capacity to a total memory capacity is displayed on an upper side of the inner sealing portion 171.

According to an embodiment, when a touch input is applied to the memory indicator 171 illustrated therein, the controller 150 configures a popup window 175 containing a list of web pages to be unloaded according to the assigned unloading priorities, and the configured popup window is displayed on the display unit 170. On the other hand, when the display unit 170 is not formed of a touch screen, a popup window is configured according to an input signal applied through the input device 200.

The popup window 175 may be configured by displaying the information of web pages to be unloaded on a left side 175*a* thereof and displaying the information of web pages not to be unloaded, namely, web pages to be continuously executed, on a right side 175*b* thereof.

Furthermore, the information of web pages may include a title or execution information of the relevant web page, whether or not the relevant web page has been edited, edited content, whether or not the login has been executed, whether or not the video has been reproduced, a numerical value of buffering, and the like.

Furthermore, the popup window 175 may include the information of unloading priorities assigned to web pages 175*a* to be unloaded and/or web pages 175*b* to be continuously executed.

The user may receive information on web pages subject to unloading, and selectively exclude a specific web page from the web pages subject to unloading even prior to inevitably performing automatic unloading as the memory capacity is insufficient. Furthermore, the user may directly select a web page to be unloaded using information contained in the popup window 175 through a user input. When any input signal is not transferred to the controller 150 for a predetermined period of time subsequent to displaying the popup window 175 on the display unit 170, the popup window 175 may be unloaded.

On the other hand, when a long touch input or double tab input is applied to the memory indicator 171, the foregoing automatic unloading mode may be carried out. On the other hand, when the display unit 170 is not formed of a touch screen, the automatic unloading mode may be carried out, for example, according to an input signal applied through the input device 200.

Figure 7A:
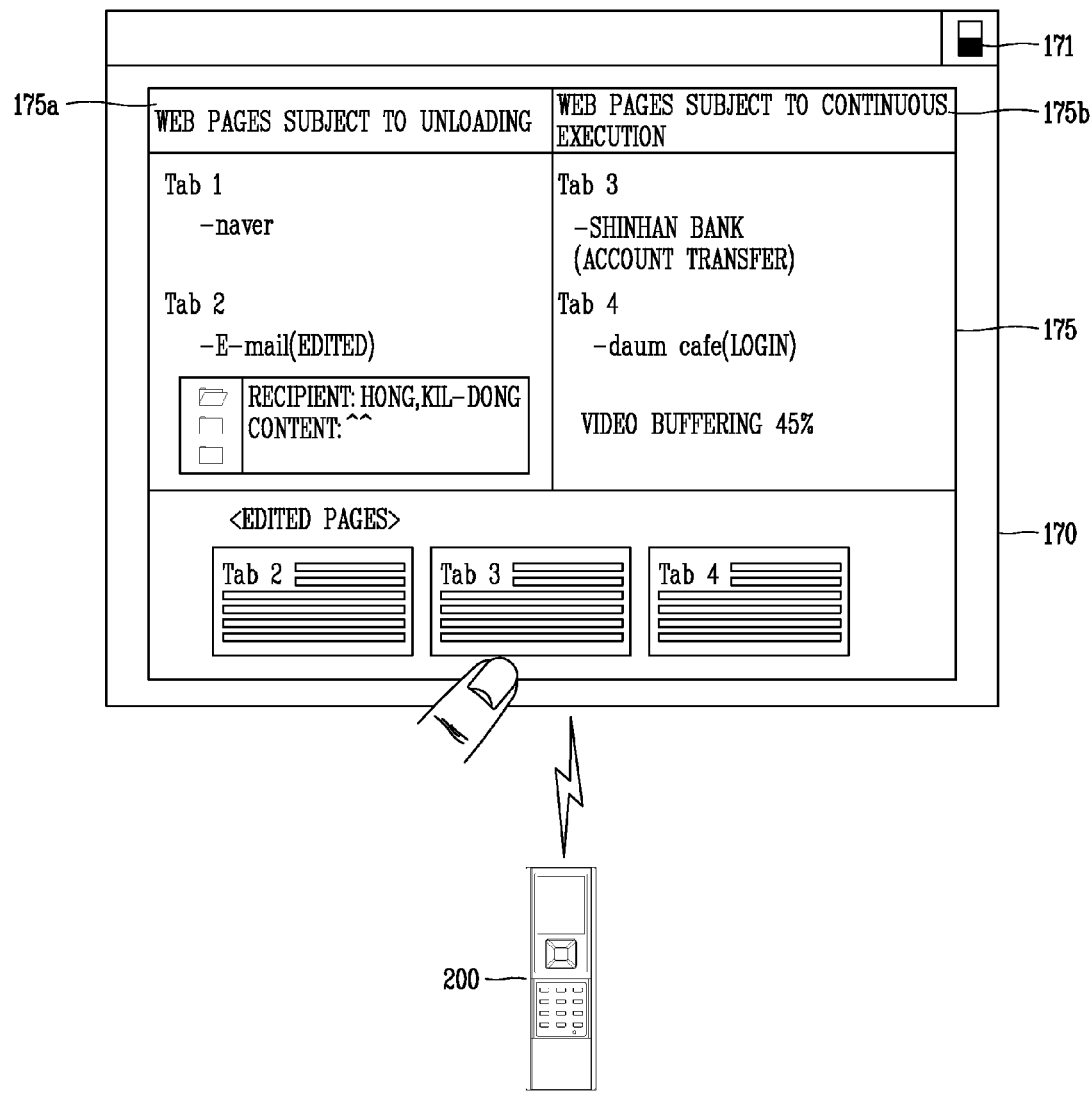
FIGS. 7A and 7B are screen configuration views in which a summary object of edited web pages is additionally displayed on a popup window in FIG. 5.
Figure 7B:
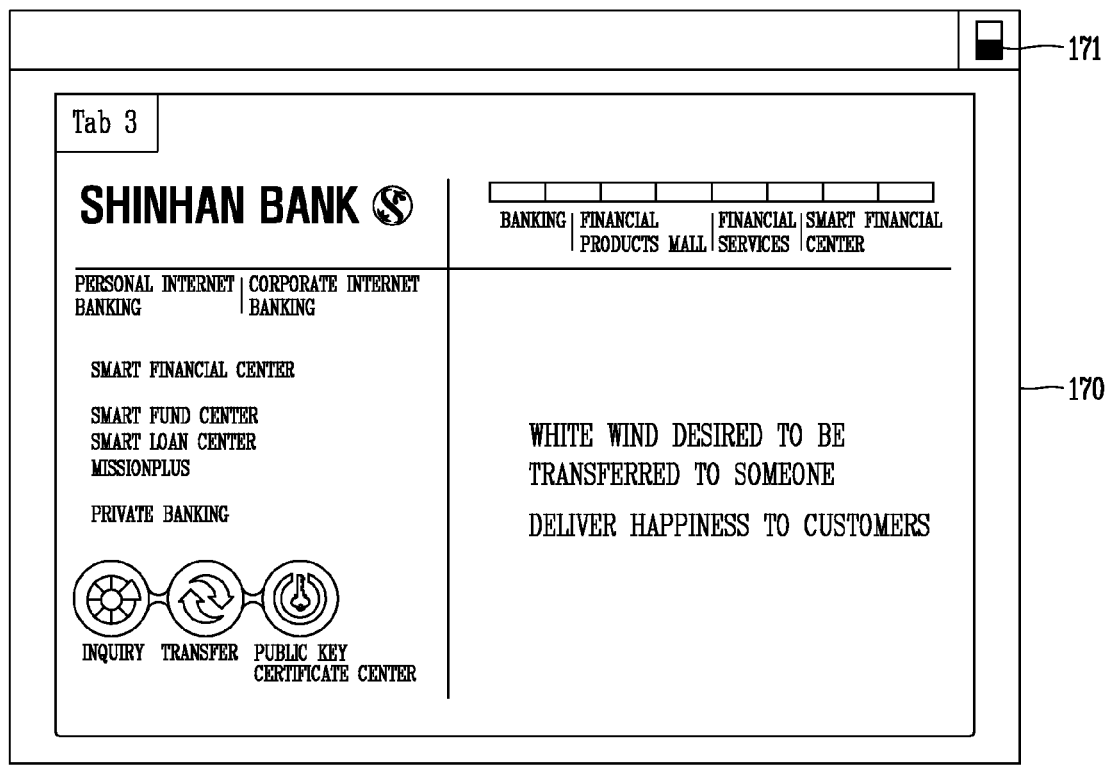

FIGS. 7A and 7B illustrate a summary object of edited web pages displayed on a popup window displayed on the display unit 170 according to an embodiment of the present disclosure.

As illustrated in the drawing, the popup window 175 further displays one or more execution information on a plurality of loaded web pages and further display the summary object of an edited web page among the loaded web pages. Here, the summary object may include any one of a representative image, a thumbnail image, and an icon capable of immediately identifying the edited web page in a visual manner. On the other hand, the memory indicator 171 for providing used memory amount information is displayed on an upper side of the display unit 170. When a long touch input, a double tab input, or an input signal is applied to the memory indicator 171 through the input device 200, an automatic unloading mode is carried out on web pages.

A list of used web pages among a plurality of loaded web pages is displayed in the form of a summary object on a lower end of the popup window 175 displayed at the center of the display unit 170. In this manner, the popup window 175 manages edited web pages as a separate list, thereby providing another unloading selection reference to the user and minimizing the loss of key data.

According to an embodiment, when a web page to be unloaded contains edited data, only the edited data may be detected and stored and then unloaded. In other words, web pages edited on the popup window 175 may be temporarily stored in the memory 160 (refer to FIG. 1) and then unloaded according to a control command of the controller 150.

Furthermore, according to an embodiment, when any one of the summary objects is selected, a web page currently displayed on the display unit 170 may be changed to a web page corresponding to the summary object.

Referring to FIGS. 7A and 7B in connection with this, when a touch input is applied to any one of the summary objects or a predetermined input signal is applied through the input device 200, the controller 150 receives the input or input signal to display a web page corresponding to the summary object on a front surface of the display unit 170.

For example, when there is a touch input or input signal to Tab 3 in the summary object illustrated therein, the corresponding Internet banking web page is displayed on a front surface of the display unit 170, and the user can continuously perform editing on a web page currently displayed on the display unit 170. Moreover, when there is a change in the previously assigned unloading priorities due to the change, the controller 150 updates and reassigns unloading priorities for a plurality of all loaded web pages, and the display unit 170 displays the updated unloading priorities.

Figure 8A:
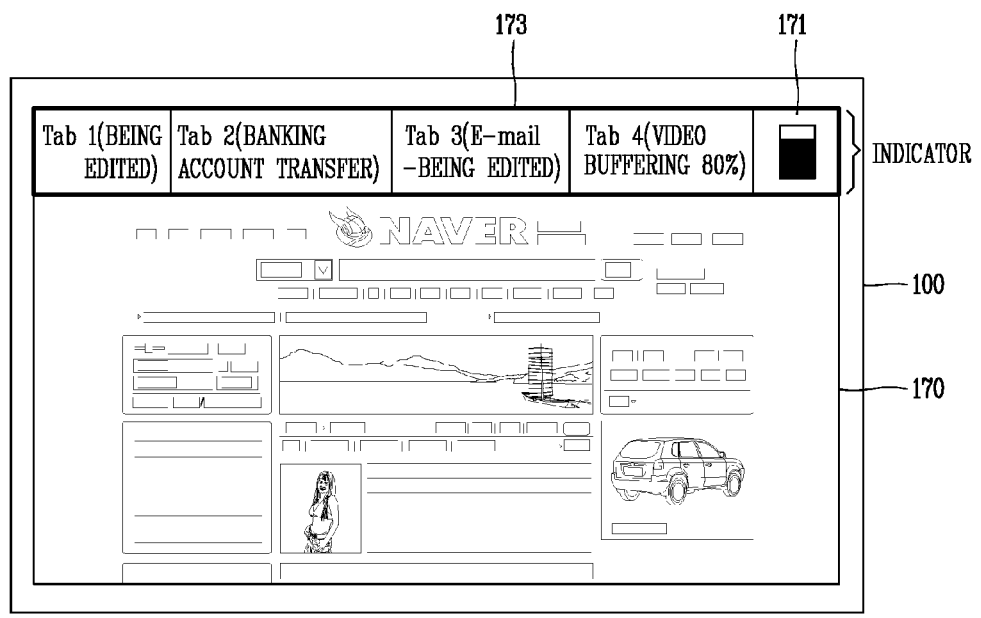
FIGS. 8A and 8B are screen configuration views in which an indicator containing the information of loaded web pages is displayed on a side of the display unit according to an embodiment of the present disclosure.
Figure 8B:
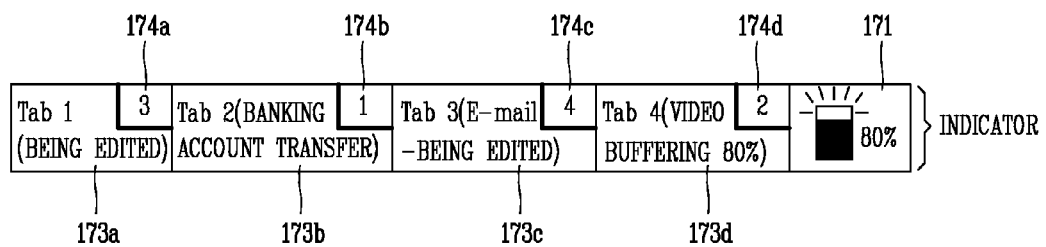

FIGS. 8A and 8B illustrate an indicator 173 containing the information of loaded web pages displayed on a side of the display unit 170 according to an embodiment of the present disclosure.

According to an embodiment, when a plurality of web pages are loaded, the indicator 173 containing at least one of whether or not each web page has been edited, an elapsed time subsequent to loading, an occupied memory size, and assigned unloading priorities is displayed on a side of the display unit 170. The indicator 173 may further include the memory indicator 171 containing the information of a memory capacity used by a plurality of loaded web pages. The indicator 173 may include simple identification information on each page, whether or not each web page has been edited, an elapsed time subsequent to loading, a used memory capacity, assigned unloading priorities, whether or not the login has been executed, a buffering ratio of the video, and the like, in the form of a text or image, as the execution information of loaded web pages.

Referring to FIG. 8B, the indicator 173 may be partitioned into a number of loaded web pages, for example, and execution information on a plurality of loaded web pages may be contained in the partitioned regions 173*a*, 173*b*, 173*c*, 173*d*, respectively. Furthermore, unloading priorities 174*a*, 174*b*, 174*c*, 174*d* assigned to the corresponding web pages may be displayed in the form of a text on a side of the partitioned regions 173*a*, 173*b*, 173*c*, 173*d*, respectively. Otherwise, it may be implemented such that the displayed sequence of web pages located in the partitioned regions 173*a*, 173*b*, 173*c*, 173*d* may be sequentially displayed in the order of high or low unloading priorities, for example, according to the assigned unloading priorities. Furthermore, according to an embodiment, when a touch input is applied to specific partitioned regions or an input signal corresponding thereto is applied, it may be possible to implement that a web page of the relevant region is displayed on a front surface of the display unit 170 regardless of the assigned unloading priorities. At this time, when there is a change in the previously assigned unloading priorities, the controller 150 updates and reassigns unloading priorities for a plurality of all loaded web pages, and the display unit 170 displays the updated unloading priorities.

According to the foregoing embodiment, when unloading of a web page is inevitably required as a plurality of web pages are loaded and thus the memory space is insufficient, web pages may be implemented to be unloaded based on unloading priorities assigned to a plurality of loaded web pages by user preference, thereby minimizing data loss based on any unloading. Moreover, when the memory capacity exceeds or approaches an allowable reference value as a plurality of web pages are executed, it may be notified to the user in advance and the assigned unloading priorities may be provided to allow the user's selective unloading, thereby providing the user's convenience and enhancing the use efficiency of a web browser.

The configurations and methods according to the embodiments disclosed herein will not be applicable in a limited way, and all or part of each embodiment may be selectively combined and configured to make various modifications thereto.

What is claimed is:

1. An image display device comprising:
  a memory;
  a display unit configured to display at least one of a plurality of web pages loaded to the memory; and
  a controller configured to:
    assign unloading priorities to the plurality of loaded web pages according to a predetermined reference,
    detect and store edited data of the plurality of loaded web pages,
    generate and display an icon associated with the edited data,
    in response to a selection of the displayed icon, display the edited data corresponding to the selected icon on a currently displayed web page,
    unload at least some of the plurality of loaded web pages according to the assigned unloading priorities and output an alarm when a memory capacity used by the plurality of loaded web pages exceeds an available reference value of the memory, display an indicator comprising the assigned unloading priorities on the display unit when the plurality of web pages are loaded to the memory, update and reassign unloading priorities for the plurality of loaded web pages when the displayed web page is changed based on an input applied to the indicator, and change the displayed assigned unloading priorities into the reassigned unloading priorities when the assigned unloading priorities are updated.

2. The image display device of claim 1, wherein the unloading priorities are assigned according to the predetermined reference, and the predetermined reference comprises at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read.

3. The image display device of claim 1, further comprising:

an interface unit configured to receive an input signal generated through a user input and provide it to the controller, wherein the input signal is an unloading execution mode of the plurality of loaded web pages selected through the user input.

4. The image display device of claim 3, wherein the unloading execution mode comprises an automatic unloading mode, and the controller unloads the plurality of unloaded web pages according to the assigned unloading priorities until a memory capacity used by the plurality of loaded web pages is less than an available reference value of the memory when an input signal of the automatic unloading mode is applied.

5. The image display device of claim 3, wherein the unloading execution mode comprises a manual unloading mode, and the controller generates a list configured with the assigned unloading priorities and the execution information of web pages corresponding thereto and provides the generated list to the display unit when an input signal of the manual unloading mode is applied.

6. The image display device of claim 1, wherein the indicator further comprises at least one of whether or not each web page has been edited, an elapsed time subsequent to loading, and a used memory capacity.

7. The image display device of claim 1, wherein the display unit is further configured to display a memory indicator indicating a currently available memory capacity or a memory capacity used by the plurality of loaded web pages on a side of the display unit when the plurality of web pages are loaded to the memory.

8. The image display device of claim 7, wherein the controller configures a popup window displayed with a list of web pages to be unloaded according to the assigned unloading priorities and provides the configured popup window to the display unit when an input is applied to the memory indicator.

9. The image display device of claim 8, wherein the popup window further displays at least one or more execution information on the plurality of loaded web pages and each summary object of an edited web page among the plurality of loaded web pages.

10. The image display device of claim 7, wherein the controller unloads the plurality of loaded web pages according to the assigned unloading priorities until a memory capacity used by the plurality of loaded web pages is less than an available reference value of the memory when a long touch input or double tab input is applied to the memory indicator.

11. A memory management method of an image display device, the method comprising:

executing a web browser to load a plurality of web pages corresponding to a web address received from the user to a memory;

displaying at least one of the plurality of loaded web pages on a display unit;

assigning unloading priorities to the plurality of loaded web pages;

detecting and storing edited data of the plurality of loaded web pages;

generating and displaying an icon associated with the edited data;

in response to a selection of the displayed icon, displaying the edited data corresponding to the selected icon on a currently displayed web page;

displaying an indicator comprising the assigned unloading priorities on the display unit when the plurality of web pages are loaded to the memory;

updating and reassigning unloading priorities for the plurality of loaded web pages when the displayed web page is changed based on an input applied to the indicator;

changing the displayed assigned unloading priorities into the reassigned unloading priorities when the assigned unloading priorities are updated;

determining whether or not a memory capacity used by the plurality of loaded web pages exceeds an available reference value of the memory; and unloading at least some of the plurality of loaded web pages according to the assigned unloading priorities and outputting an alarm when the memory capacity of the memory exceeds the available reference value as a result of the determination.

12. The method of claim 11, wherein said unloading at least some of the plurality of loaded web pages comprises:

selecting either one of an automatic unloading mode and a manual unloading mode through a user input;

unloading the plurality of loaded web pages according to the assigned unloading priorities until a memory capacity used by the plurality of loaded web pages is less than an available reference value of the memory when the automatic unloading mode is selected; and generating a list configured with the assigned unloading priorities and the execution information of web pages corresponding thereto and providing the generated list to the display unit to unload the user's selected web pages when the manual unloading mode is selected.

13. The method of claim 11, wherein the unloading priorities are assigned according to a predetermined reference, and the predetermined reference comprises at least one of a time that has been passed from the finally used time of the web page, whether the web page is enlarged or reduced, whether or not the web page is edited, whether or not a text of the web page is edited, a length of the edited text, whether or not a user draw is performed in the HTML5 canvas, a number of clicks of the web page, whether or not the web page is in a read mode, and a total time for which the web page has been read.

14. The method of claim 11, further comprising:
generating a popup window containing a list of web pages subject to unloading according to the assigned unloading priorities and displaying the generated popup window on the display unit when an input signal is received.

15. The method of claim 14, wherein the popup window further displays at least one or more execution information on the plurality of loaded web pages and each summary object of an edited web page among the plurality of loaded web pages.

16. The method of claim 15, further comprising:
changing a web page currently displayed on the display unit to a web page corresponding to the summary object when any one of the summary objects is selected.

17. The method of claim 11, wherein the indicator further comprises at least one of whether or not each web page has been edited, an elapsed time subsequent to loading, and a used memory capacity.

18. The method of claim 11, wherein prior to the unloading at least some of the plurality of loaded web pages, the method further comprises:
storing edited web pages among the plurality of loaded web pages;
generating each document selector for the edited web pages and displaying the each document selector on the display unit; and
containing the edited content of a web page corresponding to the selected document selector in a web page currently displayed on the display unit when any one of the document selectors is selected.

\* \* \* \* \*